(12) United States Patent
Ruppert et al.

(10) Patent No.: US 11,670,992 B2
(45) Date of Patent: Jun. 6, 2023

(54) ELECTRICAL MACHINE HAVING AN INTEGRATED TEMPERATURE SENSOR AND ROTOR CONDITION CAPTURE SENSOR

(71) Applicant: Schaeffler Technologies AG & Co. KG, Herzogenaurach (DE)

(72) Inventors: Andreas Ruppert, Buhl (DE); Michael Marsetz, Rastatt (DE); Thomas Fritz, Rheinstetten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 148 days.

(21) Appl. No.: 17/293,142

(22) PCT Filed: Nov. 4, 2019

(86) PCT No.: PCT/DE2019/100942
§ 371 (c)(1),
(2) Date: May 12, 2021

(87) PCT Pub. No.: WO2020/098871
PCT Pub. Date: May 22, 2020

(65) Prior Publication Data
US 2022/0006364 A1   Jan. 6, 2022

(30) Foreign Application Priority Data
Nov. 12, 2018 (DE) .......................... 102018128178.1

(51) Int. Cl.
*H02K 11/25* (2016.01)
*H02K 11/21* (2016.01)
*H02K 5/22* (2006.01)

(52) U.S. Cl.
CPC ............. *H02K 11/25* (2016.01); *H02K 5/22* (2013.01); *H02K 11/21* (2016.01)

(58) Field of Classification Search
CPC .......... H02K 11/25; H02K 11/21; H02K 5/22
(Continued)

(56) References Cited

U.S. PATENT DOCUMENTS

| 10,995,802 B2 | 5/2021 | Lehmann et al. |
| 2014/0012473 A1* | 1/2014 | Ommer ................. B60K 6/387 701/68 |
| 2017/0063204 A1 | 3/2017 | Dumas |

FOREIGN PATENT DOCUMENTS

| DE | 19505543 | 8/1996 | |
| DE | 102010030968 A1 * | 1/2012 | ............... G01K 1/08 |

(Continued)

*Primary Examiner* — Jose A Gonzalez Quinones
(74) *Attorney, Agent, or Firm* — Volpe Koenig, P.C.

(57) ABSTRACT

An electric machine for a drive of a motor vehicle, having a stator, a rotor which can be rotated relative to the stator, a temperature sensor arranged and designed to capture a temperature of the stator and a rotor condition capture sensor which is arranged and designed to capture a rotational speed and/or rotational position of the rotor accommodated in a stator-fixed manner. The temperature sensor and the rotor condition capture sensor are implemented as subsystems of a common sensor system, wherein a first subsystem having the temperature sensor has an elastic thermally conductive contact element connected to the temperature sensor, which contact element is permanently fitted to a contact region of the stator. A hybrid module having this electric machine is also provided.

19 Claims, 6 Drawing Sheets

(58) Field of Classification Search
USPC .............................................. 310/68 B, 68 C
See application file for complete search history.

(56) References Cited

FOREIGN PATENT DOCUMENTS

| | | |
|---|---|---|
| DE | 102017116232 | 7/2018 |
| EP | 1322026 | 6/2003 |
| JP | 2004140976 A * | 5/2004 |
| JP | 2011259549 | 12/2011 |

* cited by examiner

ELECTRICAL MACHINE HAVING AN INTEGRATED TEMPERATURE SENSOR AND ROTOR CONDITION CAPTURE SENSOR

CROSS-REFERENCE TO RELATED APPLICATIONS

This application is the U.S. National Phase of PCT Appln. No. PCT/DE2019/100942, filed Nov. 4, 2019, which claims priority to DE 102018128178.1, filed Nov. 12, 2018, the entire disclosures of which are incorporated by reference herein.

TECHNICAL FIELD

The disclosure relates to an electric machine for a drive of a motor vehicle, such as a car, truck, bus, or other commercial vehicle, in particular for a drive train or for a wheel hub drive of a hybrid vehicle or an electric vehicle, having a stator, a rotor that can be rotated relative to the stator, a temperature sensor arranged and designed to capture a temperature of the stator as well as a rotor condition capture sensor arranged and designed to capture a rotational speed and/or rotational position of the rotor accommodated in a stator-fixed manner.

BACKGROUND

Generic electric machines, such as those used in hybrid modules, are already sufficiently known from the prior art. DE 10 2017 116 232 A1 discloses, for example, a hybrid module for a drive train of a motor vehicle having a rotor position sensor and a temperature sensor.

Thus, in principle, applications are already known in which various sensors are used which capture angular and/or rotational information from the electric machine. To minimize the effects of torsion or tolerances on the sensors during operation, these are fitted as close as possible to the electric machine, with integration usually taking place in a housing of the electric machine. However, it has been found to be disadvantageous that in most cases the sensors must be connected individually to the housing, for example via screw connections. This results in a relatively high installation effort. Furthermore, there are various winding technologies for the coils of the electric machines, for example hairpin or bar wave windings, in which temperature capture is relatively difficult because these windings are very tightly wound or fitted and no temperature sensor can be plugged in between the windings or the respective wires.

SUMMARY

It is therefore the object of the present disclosure to eliminate the disadvantages known from the prior art and, in particular, to provide an electric machine for which the assembly effort is further reduced and which enables reliable capture of the temperature as well as the rotational speed and/or rotational position.

This is achieved according to the disclosure in that the temperature sensor and the rotor condition capture sensor are implemented as subsystems of a common sensor system, a first subsystem having the temperature sensor having an elastic, thermally conductive contact element connected to the temperature sensor, which contact element is permanently fitted to a contact region of the stator.

By implementing such a sensor system as one structural unit/one sensor module, consisting of the temperature sensor and the rotor condition capture sensor, the assembly effort is significantly reduced. Furthermore, by providing and pressing the contact element, a particularly stable attachment of the temperature sensor takes place in a tolerance-compensating manner, so that particularly reliable temperature capture during operation is ensured. Such a design also results in the following advantages: fewer screw connections and less assembly effort; fewer tolerances due to a reduced number of components; automated assembly processes; contacting the temperature sensor on a measuring surface is ensured by a compensating element (contact element); less machining of the existing castings; only one cable duct; only one plug.

Further advantageous embodiments are claimed in the claims and explained in more detail below.

Accordingly, it is also advantageous if the contact element rests against a radial outside, a radial inside, a circumferential side or an axial side of a coil winding of the stator or is at least partially arranged/inserted within the coil winding, i.e., preferably between two adjacent wires of the coil winding. As a result, the temperature sensor is provided for the most precise possible temperature capture on the stator.

This advantage is further increased if the contact element is pressed directly against a wire of the coil winding.

In addition, it is expedient if the contact element is pressed against the wire in such a way that the wire deforms the contact element at least partially elastically. As a result, the contact element hugs the wire and surrounds it on several sides. The result is a heat transfer to the contact element with as little loss as possible.

Furthermore, it is advantageous if the first subsystem is connected directly or indirectly to a second subsystem having the rotor condition capture sensor via a snap-in connection, i.e., with at least one or more snap-in lugs/hooks. In this way, the assembly is significantly simplified.

In this regard, it is also expedient if the first subsystem is connected to a housing region of the sensor system that forms a cable duct (via this snap-in connection). The second subsystem is also fitted/integrated to the housing region.

A power supply is implemented in a particularly space-saving manner if a main line routed in the cable duct is further connected to the temperature sensor and the rotor condition capture sensor.

The first subsystem and/or the second subsystem are/is preferably electrically connected to a line connection of the sensor system. This results in a central line connection in the form of a plug; the structure is thus further simplified.

The disclosure further relates to a hybrid module for a motor vehicle drive train, with an electric machine according to the disclosure according to at least one of the embodiments described above and at least one clutch that is operatively connected to the rotor. A hybrid module A hybrid module is understood here to mean a special type of electric machine or a special electrical system.

In other words, according to the disclosure, an integration of a temperature sensor including tolerance compensation in connection with a rotor position sensor system takes place. According to the disclosure, the rotor position sensor (rotor condition capture sensor) and the temperature sensor are integrated into a common higher-level sensor system, which sensor system in turn has a subsystem having the rotor position sensor and a subsystem having the temperature sensor, which subsystems function independently of one another and are flexibly connected to one another. The temperature sensor subsystem has a flexible or elastic element to provide a clean, thermally conductive connection between the temperature sensor subsystem and the stator of the electric machine.

BRIEF DESCRIPTION OF THE DRAWINGS

The disclosure will now be explained in more detail with reference to figures, in which context various exemplary embodiments are also shown in principle. In the drawings.

DETAILED DESCRIPTION

The figures are only schematic in nature and serve only for understanding the disclosure. The same elements are provided with the same reference symbols. The different features of the various exemplary embodiments can in principle also be freely combined with one another.

Figure 1:
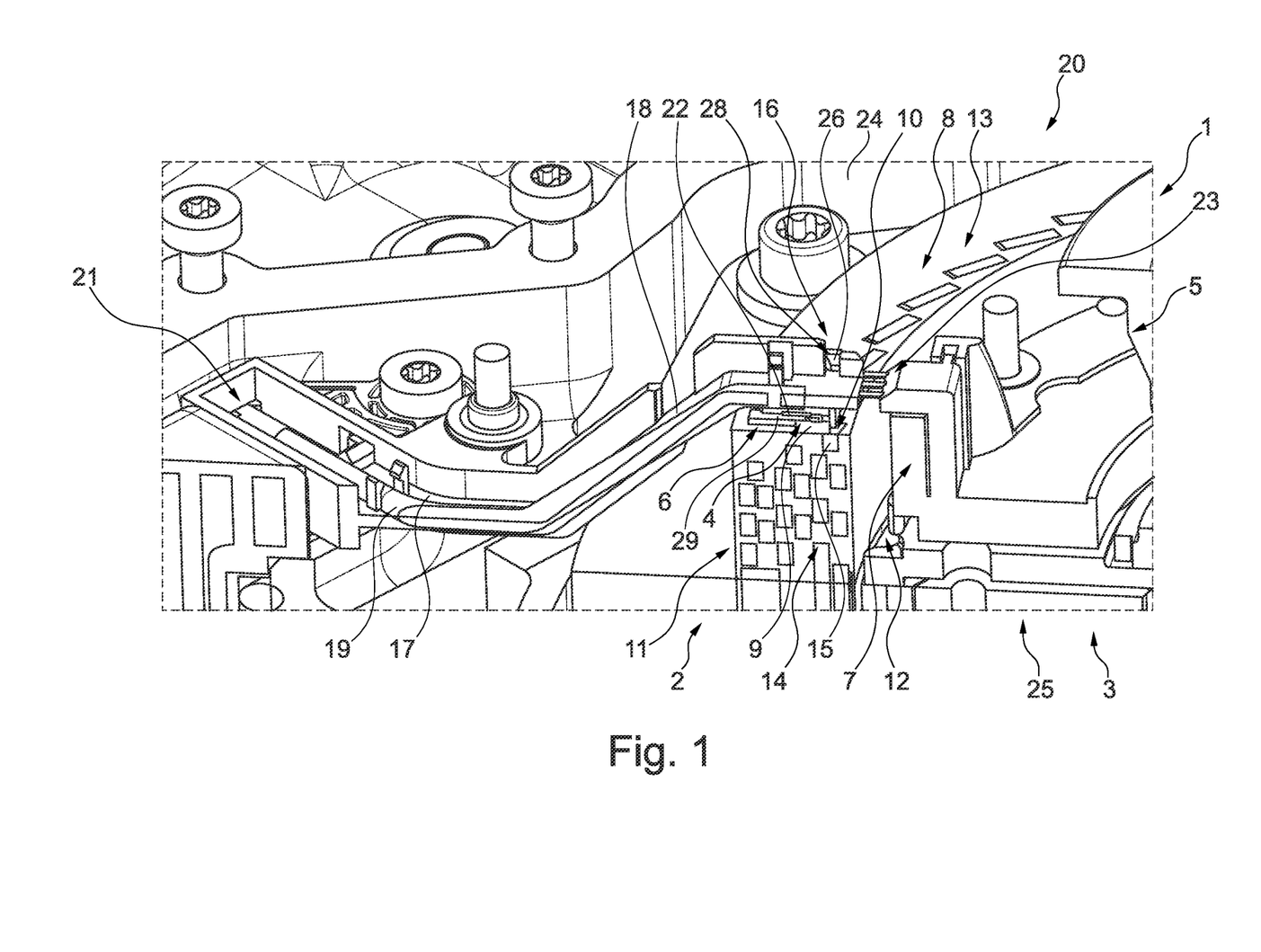
FIG. 1 shows a perspective detailed illustration of an electric machine according to the disclosure used in a hybrid module, wherein a location of a temperature sensor of a sensor system is clearly visible.

An electric machine 1 according to the disclosure, as can be seen in principle in the structure thereof in FIG. 1 according to a preferred exemplary embodiment, is preferably part of a hybrid module 20 in the operation thereof, which can be seen in part in FIG. 1. The electric machine 1 is therefore preferably part of a motor vehicle drive train, such as a drive train, a hybrid vehicle or a purely electric vehicle. The electric machine 1 is thus used as a drive machine in the drive train. In addition to the electric machine 1, the hybrid module 20 typically has clutches, not shown for the sake of clarity, which are used to act on the input side or the output side of a rotor 3. The electric machine 1 can in principle also be integrated directly into a wheel hub drive.

In FIG. 1, a housing 24 of the electric machine 1 is shown schematically. A stator 2 is firmly connected to the housing 24. The stator 2 can be seen in particular with the coil winding 14 thereof, which is firmly received in the housing 24. A rotor 3 (rotor shaft) of the electric machine 1 is mounted in the housing 24 so that it can rotate about a rotational axis relative to the stator 2.

A sensor system 8 according to the disclosure is fitted in a housing-fixed/stator-fixed manner. The sensor system 8 according to the disclosure has both a temperature sensor 4 (NTC or PTC) and a rotor condition capture sensor 5 in the form of a rotor position sensor. According to the disclosure, the temperature sensor 4 and the rotor condition capture sensor 5 are each integrated in a separate subsystem 6, 7 of the sensor system 8. The two subsystems 6, 7 and thus the temperature sensor 4 and the rotor condition capture sensor 5 are connected to one another.

Figure 2:
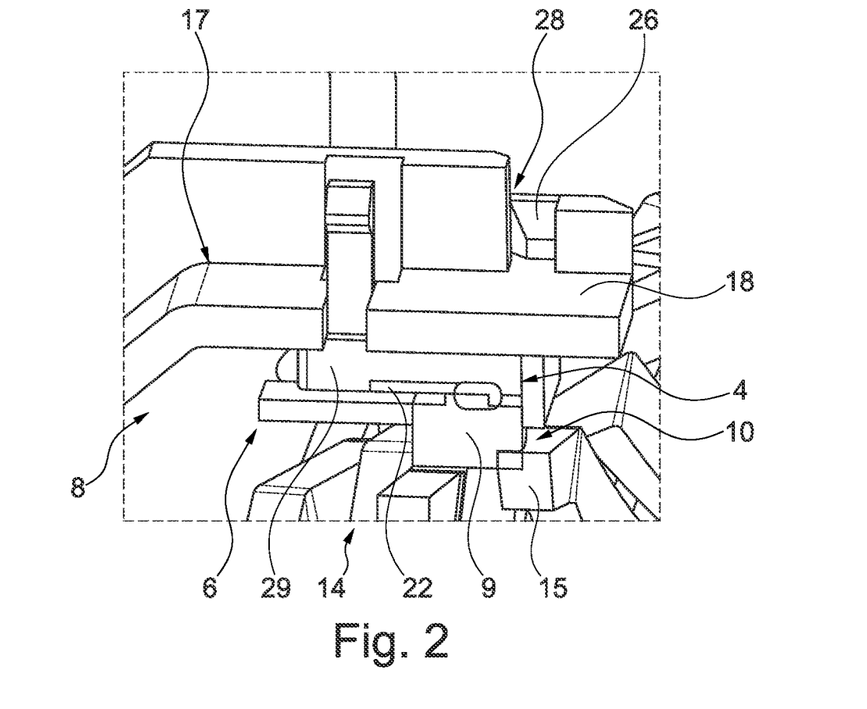
FIG. 2 shows a perspective illustration of the sensor system cut in the area of the temperature sensor.
Figure 3:
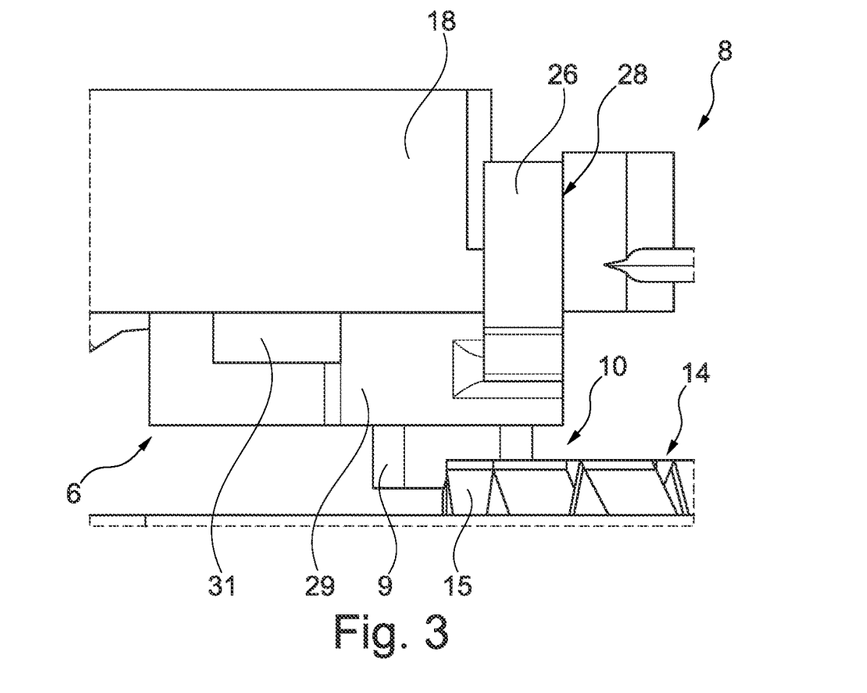
FIG. 3 shows a front view of the sensor system in the area of the temperature sensor.

The two subsystems 6, 7 are flexibly coupled/connected to one another. In this embodiment, in conjunction with FIGS. 6 to 10, the first subsystem 6, which can be seen in greater detail, is fitted to a housing region 18 of the sensor system 8 via a snap-in connection 16, that is to say in a form-fit manner. The first subsystem 6 has a contact element 9 which, according to the disclosure, rests immediately/directly on a wire 15 of the coil winding 14. The basic position of the first subsystem 6/contact element 9 can be seen in FIG. 1. It can be seen here that the contact element 9 is positioned on an axial side 13 of the coil winding 14, wherein the contact element 9 in principle can also be arranged on other areas, such as a radial outside 11 or a radial inside 12 or between several wires 15 of the coil winding 14 according to further explanations. The contact between the contact element 9 and the coil winding 14 takes place on a contact region 10 of the coil winding 14, which contact region 10 is implemented here on a wire 15 of the coil winding 14. The contact element 9 thus according to FIGS. 2 and 3 lies flatly on the stator 2/coil winding 14. During operation, the thermally conductive contact element 9 partially transfers the heat generated in the stator 2 to the temperature sensor 4, as it is embedded in the first subsystem 6, to thus capture the temperature of the stator 2. The contact element 9 can, for example, be designed in the form of a silicone pad, an elastomer, or in the form of a compression spring.

Figure 11:
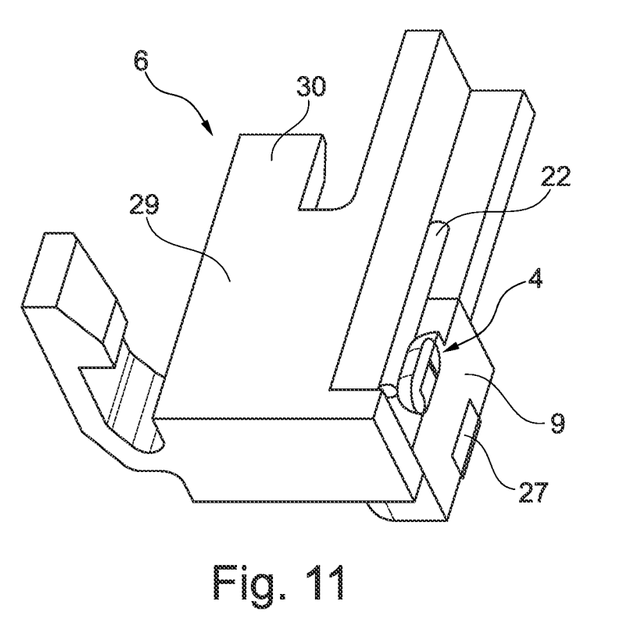
FIG. 11 shows a perspective view of an alternatively designed subsystem with a copper insert.

In this context, reference is made to a further subembodiment, as shown with FIG. 11. According to this embodiment, it is in principle also possible to integrate an additional copper insert 27 into the contact element and to have it bear directly on the contact region 10.

The temperature sensor 4 is then typically further electrically connected to a main line 19 of the sensor system 8 by means of a first line 22, which is partially shown schematically here. The first subsystem 6 also has a receiving element 29 to which the temperature sensor 4 and the contact element 9 are fitted. The first subsystem 6 is finally, as with the interaction of FIGS. 8 and 9, fitted to the housing region 18 via a snap-in connection 16. For this purpose, the receiving element 29 has two snap-in hooks 26/snap-in lugs which are elastically deformable. These snap-in hooks 26 clasp the housing region 18 and are locked into corresponding recesses 28 of the housing region 18. At the same time, retaining lugs 30 protrude from the receiving element 29 and are pushed into receptacles 31 of the housing region 18 in opposite directions. Finally, the receiving element 29 and the first subsystem 6 are fastened to the housing region 18 in a particularly robust manner.

Returning to FIG. 1, it should also be mentioned that the rotor condition capture sensor 5 is positioned and designed in a typical manner for capturing a rotational speed and a rotational position of the rotor 3 of the electric machine 1. The rotor condition capture sensor 5 is part of a second subsystem 7 of the sensor system 8. The rotor condition capture sensor 5 is connected to the line connection 21 via a second line 23. The second line 23 is preferably implemented as a 6-pole (alternatively also 4-pole) line. The two lines 22 and 23 are finally combined in a main line 19 (6-pole or 8-pole cable), the main line in turn being guided in the housing region 18 with the formation of a cable duct 17. The main line is finally connected to the line connection 21, which line connection 21 forms a plug. As a result, a signal transmission/power supply typically takes place during operation via the line connection 21 to power electronics not shown here for the sake of clarity.

Figure 4:
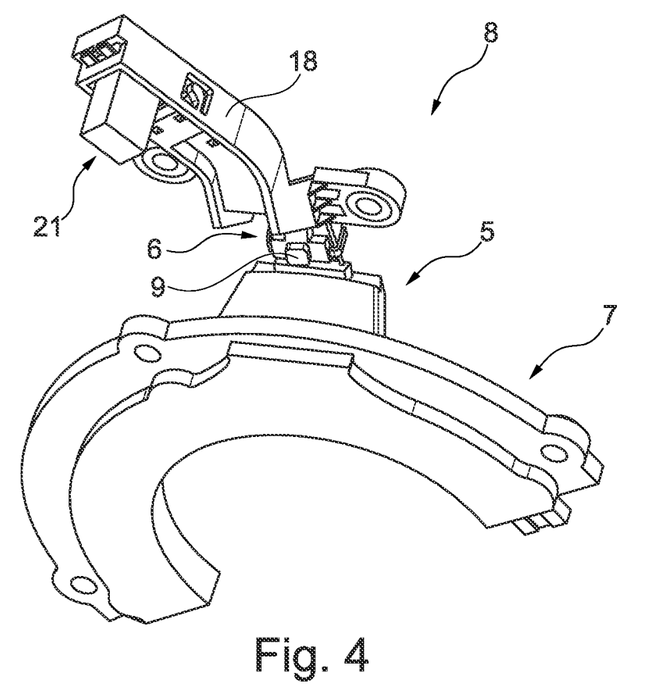
FIG. 4 shows a perspective view of the sensor systems used in FIGS. 1 to 3 from an underside.
Figure 5:
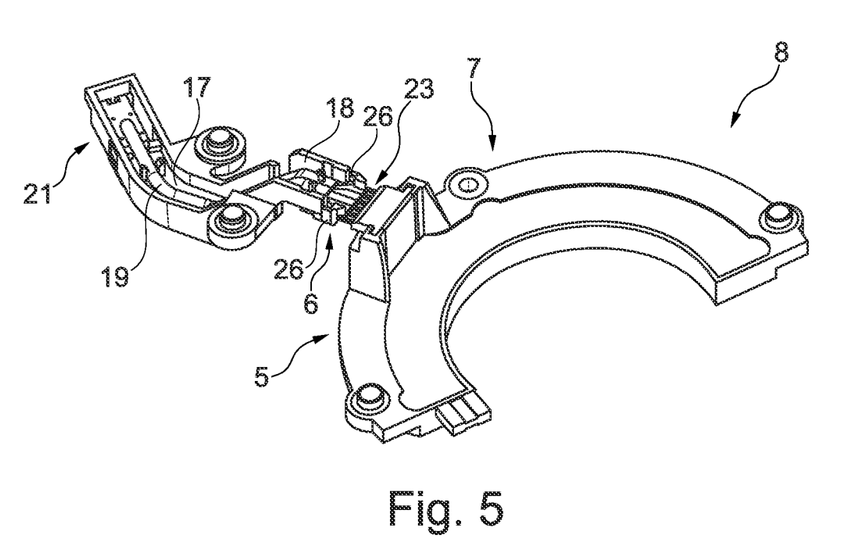
FIG. 5 shows a perspective view of the sensor system according to FIG. 4 from an upper side.
Figure 6:
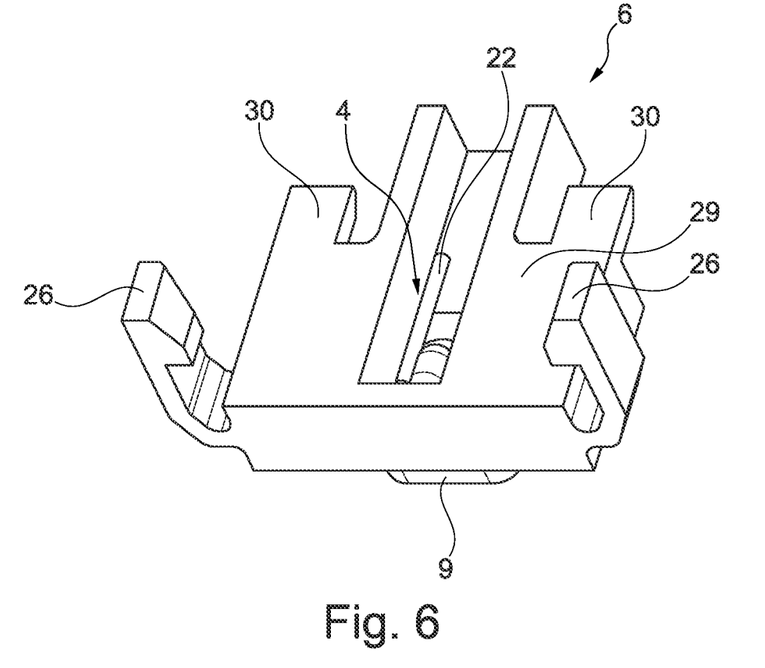
FIG. 6 shows a perspective view of a subsystem having the temperature sensor from an underside, with two snap-in hooks enabling a snap-in connection being clearly visible.
Figure 7:
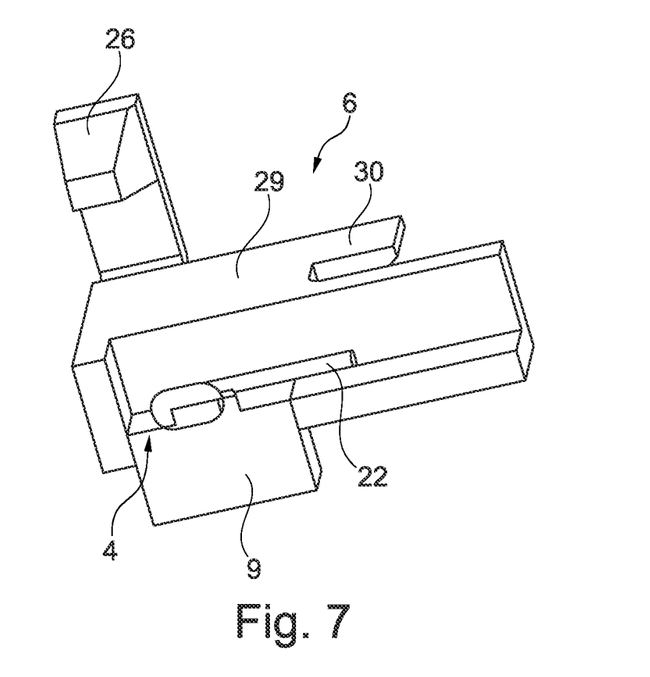
FIG. 7 shows a sectional view of the subsystem according to FIG. 7, so that a contact element can be seen.
Figure 8:
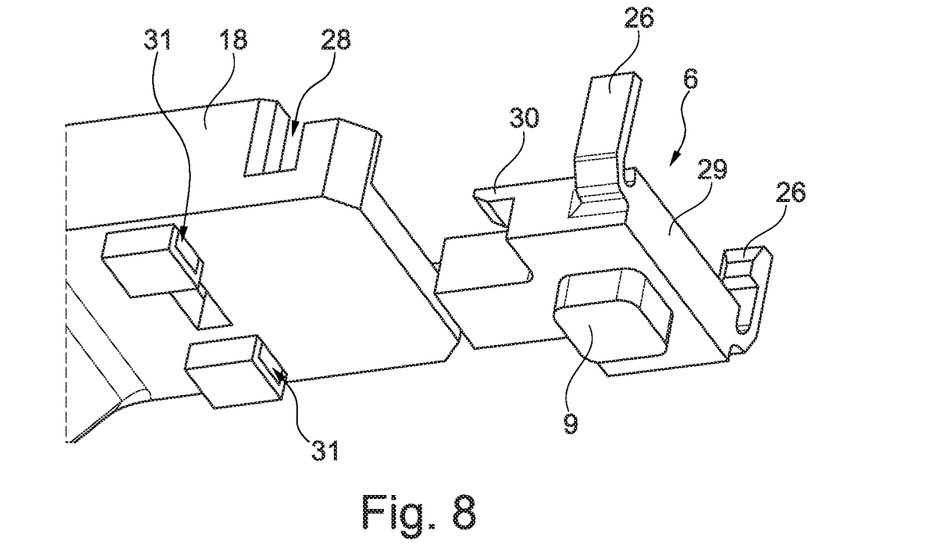
FIG. 8 shows a perspective view of the subsystem according to FIGS. 6 and 7 in a condition of having been removed from a housing region of the sensor system.
Figure 9:
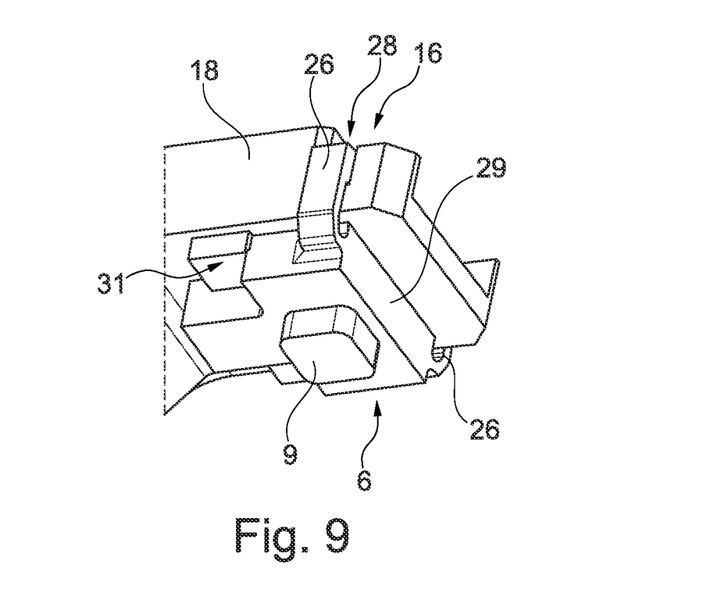
FIG. 9 shows a perspective view of the first subsystem with the housing region in the assembled condition.
Figure 10:
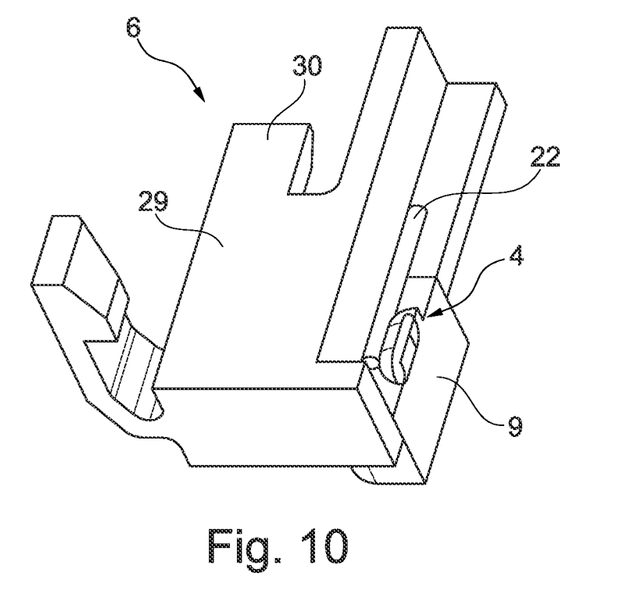
FIG. 10 shows a perspective illustration of the sectioned subsystem according to FIG. 7 from an upper side.

The rotor condition capture sensor 5 is thus permanently fitted to the stator 2. The rotor condition capture sensor 5 interacts with an encoder 25 which is coupled to the rotor 3 in a rotationally fixed manner. The encoder 25 is preferably implemented as a corresponding encoder wheel and generates a signal corresponding to the rotational position at the rotor condition capture sensor 5. The rotor condition capture sensor 5 is primarily designed to capture the rotational position, i.e., the angular position of the rotor 3. In a further embodiment, the rotor condition capture sensor 5 is also designed to capture a rotational speed of the rotor 3 at the same time. As also in connection with FIGS. 4 and 5, the second subsystem 7 is also attached to the housing region 18 in this embodiment. As a result, the two subsystems 6, 7 are permanently connected to one another and integrated in a common module. Alternatively, the first subsystem 6 is also directly connected/fitted to the second subsystem 7.

In other words, the solution according to the disclosure for an electric machine 1 (EM) consists of integrating two sensor systems 6, 7 in an overall sensor system 8, which also consists of an RPS subsystem 7 and an NTC subsystem 6 which continue to work independently of each other. The advantage consists essentially of the integration of the overall system 8, since it is now possible to integrate the overall sensor system 8 into one and no longer two systems that are independent and one after the other. In addition, this system 8 offers an advantage over the prior art: since the entire assembly is blindly joined, the correct position is ensured from the start and the installation tolerances are also compensated. In this case the NTC 6 has a flexible element (contact element 9). This flexible element 9 adapts to the contour of the electric machine 1 and ensures a guaranteed contact between the NTC 6 and the winding 14 of the electric machine 1. All tolerances can thus be compensated.

In terms of the solution according to the disclosure (according to FIG. 1), the temperature sensor 4 (for example an NTC or PTC) is combined with an RPS sensor 5. The temperature sensor 4 can either be permanently or flexibly integrated into the RPS sensor 5. In any case, a contact surface must be established between temperature sensor 4 and winding 14 of electric machine 1 to capture the temperature. In the case of a permanent connection, this can only be achieved with difficulty, since axial, radial and/or, tangential tolerances must be compensated for. The contact surface produced, ideally in the area of the windings 14, can be produced at any point on the electric machine 1 (stator 2), for example radially, tangentially, or axially. Since a contact surface with the electric machine 1 (windings 14) can only be realized with difficulty with a permanent connection between temperature sensor 4 and RPS sensor 5, a flexible arrangement of temperature sensor 4 and RPS sensor 5 is recommended. This flexible connection can be produced, for example, by a suitable flexible or elastic element. The contact surface of the temperature sensor 4 can lie radially below the electric machine winding 14, radially above, inside the windings 14, and axially outside the windings 14.

The contact surface of the temperature sensor 4 can act actively or passively on the measuring surface to be captured. The temperature sensor 4 must lie against the winding 14 in a defined and firmly seated position. The rotor position sensor 5 can, for example, involve the functional principle of a resolver, eddy current sensor, GMR, etc. Novel types of sensors are also conceivable. RPS stands for "rotor position sensor" and is referred to in German as RLS/"Rotorlagesensor". As a result of this integration, the number of components can also be reduced, since, for example, a cable duct 17 or a common plug 21 can be used. The temperature sensor 4 is usually 2-pole, i.e., it has two signal lines. The RPS sensor 5 is usually 4- or 6-pole. For the purposes of the disclosure, a common plug 21 with 6 or 8 poles can now be used. This results in a cost and space advantage. As a result of the common integration, the two signal lines of the temperature sensor 4 are further preferably routed through the RPS sensor 5 to the power electronics. In the RPS sensor 5, this is done by a correspondingly expanded printed circuit board/PCB. Outside the sensor 5 by means of appropriate cables.

The NTC 6 is connected to the RPS 5, 7 or to the RPS cable duct (housing region 18) via a plug connection/clip connection 16. A sufficient reliability is thus established. The entire cable (main line 19) can be pre-assembled. Thus, the RPS 5 with the 6 wires thereof and the NTC 4 with the 2 wires or poles thereof are attached to the cable 19. The flexible element 9 can, for example, be designed in the form of a silicone pad, an elastomer or in the form of a compression spring. For better thermal conductivity, the flexible element 9 can contain a copper core 27. Thus, the temperature can be passed on more directly and better to the pearl. Another conductive material can also be used.

This results in the following features and advantages: —fewer screw connections and less installation effort; —lower tolerances due to the reduced number of components; —automated assembly process, as the entire assembly can be assembled as one; —contacting on the measuring surface by the temperature sensor 4 is ensured by an elastic compensating element 9; less machining of the castings; only one cable duct 17; only one 8-pole connector 21 (6 poles for RPS 5 and 2 poles for temperature); copper core 27 for better conductivity.

LIST OF REFERENCE SYMBOLS

1 Electric machine
2 Stator
3 Rotor
4 Temperature sensor
5 Rotor condition capture sensor
6 First subsystem
7 Second subsystem
8 Sensor system
9 Contact element
10 Contact region
11 Outside
12 Inside
13 Axial side
14 Coil winding
15 Wire
16 Snap-in connection
17 Cable duct
18 Housing region
19 Main line
20 Hybrid module
21 Line connection
22 First line
23 Second line
24 Housing
25 Encoder
26 Snap-in hooks
27 Copper insert 28 Recess
29 Receiving element
30 Retaining lug
31 Receptacle

The invention claimed is:

1. An electric machine for a drive of a motor vehicle, the electric machine comprising:
 a stator;
 a rotor which is rotatable relative to the stator;
 a temperature sensor arranged and configured to capture a temperature of the stator; and
 a rotor condition capture sensor arranged and configured to capture at least one of a rotational speed or rotational position of the rotor accommodated in a stator-fixed manner;
 wherein the temperature sensor and the rotor condition capture sensor are configured as subsystems of a common sensor system, a first one of the subsystems having the temperature sensor includes an elastic, thermally conductive contact element connected to the temperature sensor, and the contact element is permanently fitted to a contact region of the stator; and
 wherein the first subsystem is connected indirectly or directly to a second one of the subsystems having the rotor condition capture sensor via a snap-in connection, the snap-in connection including at least one snap-in hook of the first subsystem coupled to at least one recess of the second subsystem.

2. The electric machine according to claim 1, wherein the contact element rests against a radial outside, a radial inside, a circumferential side or an axial side of a coil winding of the stator or is at least partially arranged within the coil winding.

3. The electric machine according to claim 1, wherein the contact element is pressed directly against a wire of a coil winding of the stator.

4. The electric machine according to claim 3, wherein the contact element is pressed against the wire such that the wire deforms the contact element at least partially elastically.

5. The electric machine according to claim 1, wherein the first subsystem is connected to a housing region of the sensor system which forms a cable duct.

6. The electric machine according to claim 5, further comprising a main line guided in the cable duct that is further connected to the temperature sensor and the rotor condition capture sensor.

7. The electric machine according to claim 1, wherein at least one of the subsystems is electrically connected to a line connection of the sensor system.

8. A hybrid module for a motor vehicle drive train, comprising an electric machine according to claim 1 and at least one clutch that is operatively connected to the rotor.

9. An electric machine for a drive of a motor vehicle, the electric machine comprising:
 a stator;
 a rotor which is rotatable relative to the stator; and
 a common sensor system including a first subsystem having a temperature sensor arranged and configured to capture a temperature of the stator, an elastic, thermally conductive contact element connected to the temperature sensor, the contact element is permanently fitted to a contact region of the stator, and a copper insert is integrated into the contact element such that the copper insert directly contacts the contact region; and
 a second subsystem having a rotor condition capture sensor arranged and configured to capture at least one of a rotational speed or rotational position of the rotor.

10. The electric machine according to claim 9, wherein the contact element rests against a radial outside, a radial inside, a circumferential side or an axial side of a coil winding of the stator or is at least partially arranged within the coil winding.

11. The electric machine according to claim 9, wherein the contact element is pressed directly against a wire of a coil winding of the stator.

12. The electric machine according to claim 11, wherein the contact element is pressed against the wire such that the wire deforms the contact element at least partially elastically.

13. The electric machine according to claim 9, wherein the first subsystem is connected indirectly or directly to the second subsystem having the rotor condition capture sensor via a snap-in connection.

14. The electric machine according to claim 9, wherein the first subsystem is connected to a housing region of the sensor system which forms a cable duct.

15. The electric machine according to claim 14, further comprising a main line guided in the cable duct that is further connected to the temperature sensor and the rotor condition capture sensor.

16. The electric machine according to claim 9, wherein at least one of the first or second subsystems is electrically connected to a line connection of the sensor system.

17. An electric machine for a drive of a motor vehicle, the electric machine comprising:
 a stator;
 a rotor which is rotatable relative to the stator;
 a temperature sensor arranged and configured to capture a temperature of the stator; and
 a rotor condition capture sensor arranged and configured to capture at least one of a rotational speed or rotational position of the rotor accommodated in a stator-fixed manner;
 wherein the temperature sensor and the rotor condition capture sensor are configured as subsystems of a common sensor system, a first one of the subsystems having the temperature sensor includes an elastic, thermally conductive contact element connected to the temperature sensor, the contact element is permanently fitted to a contact region of the stator, and the contact element rests against a radial outside, a radial inside, or a circumferential side of a coil winding of the stator.

18. The electric machine according to claim 17, wherein the contact element is pressed directly against a wire of the coil winding of the stator.

19. The electric machine according to claim 18, wherein the contact element is pressed against the wire such that the wire deforms the contact element at least partially elastically.

* * * * *